United States Patent [19]
James

[11] 3,976,528
[45] Aug. 24, 1976

[54] LAMINATING METHOD
[75] Inventor: Albert L. James, Hickory Corners, Mich.
[73] Assignee: Cadillac Products, Inc., Sterling Heights, Mich.
[22] Filed: Nov. 19, 1973
[21] Appl. No.: 417,214

Related U.S. Application Data
[63] Continuation-in-part of Ser. No. 259,479, June 5, 1972.

[52] U.S. Cl. .............................. 156/244; 156/272; 156/322; 156/324; 428/336
[51] Int. Cl.² .......................................... B32B 7/00
[58] Field of Search ............ 156/82, 244, 272, 309, 156/322, 500, 324; 161/93

[56] References Cited
UNITED STATES PATENTS

| | | | |
|---|---|---|---|
| 3,360,422 | 12/1967 | Desch | 161/93 |
| 3,526,000 | 8/1970 | Williams | 156/244 |
| 3,575,762 | 4/1971 | Goehring et al. | 156/244 |

Primary Examiner—Caleb Weston
Attorney, Agent, or Firm—Harness, Dickey & Pierce

[57] ABSTRACT

An improved method for preparing a heat sealed, laminated product of at least three plies and preferably four plies and more; and, the laminated product formed by the method.

13 Claims, 3 Drawing Figures

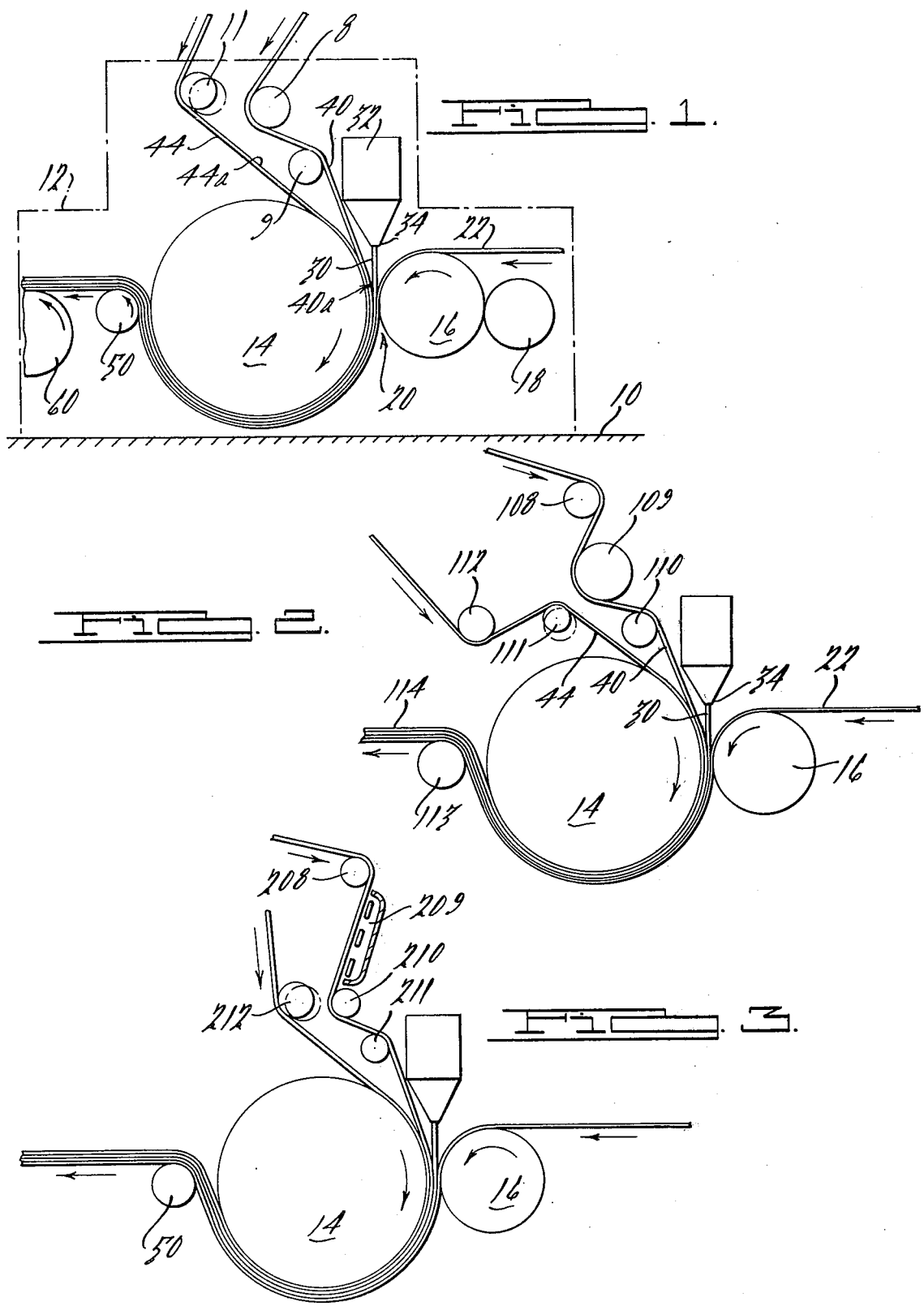

LAMINATING METHOD

CROSS REFERENCE TO RELATED APPLICATIONS

Reference is made here to commonly assigned co-pending application Ser. No. 62,295, filed Aug. 10, 1970 entitled, "Product by the Method of Preparing a Laminated Product of at Least Three Plies". This application is a continuation in part of co-pending application Ser. No. 259,479 filed June 5, 1972.

BACKGROUND OF THE INVENTION

This invention broadly relates to an improved lamination method, the product produced thereby, and the apparatus used in carrying out the method. More specifically, the invention relates to a method for preparing a heat sealed laminated product of at least three plies.

The state of the art is indicated by the following references which are cited here for the record: U.S. Pat. Nos. 3,360,412 issued to James, 3,562,000 issued to Williams, 3,081,214, issued to Strome, 3,018,189 issued to Traver, 2,920,733 issued to Sorel, 2,897,109 issued to Voigtman, 2,922,883 issued to Giaimo; and also the following U.S. Pat. Nos. 2,154,493; 2,154,474; 2,334,485; 2,423,869; 2,637,673; 2,650,213; 2,702,580; 2,174,569; 2,714,571; 2,723,935; 2,728,703; 3,276,900; 2,890,590; 3,287,197; 2,794,485; 3,149,013; 3,196,766; 2,867,560; 2,922,732; 2,940,869; 2,988,051; 3,057,766; 3,093,525; 3,132,065; 3,157,526; 3,247,041; 3,256,598; 3,034,974; 2,861,022; 2,715,075; 3,308,509; 3,298,559; 3,256,560; 2,259,347; 2,538,520; 2,551,591; 2,769,206; 2,820,722; 3,062,698; 3,457,139; and 3,539,428.

While the invention subject matter disclosed in said copending application Ser. No. 62,295 and Williams U.S. Pat. No. 3,526,000, are both highly useful and practical, the present inventive disclosure deals with the discovery of an improvement which has been found relative to the invention disclosed by Williams. In the Williams U.S. Pat. No. 3,526,000 method, it may in some instances be difficult to operate with an extruded film forming plastic material having a very thin thickness because the heat capable of being carried thereby is limited. Accordingly, the present invention deals with an improved species of operation (relative to the generic broad disclosure of the Williams method) which finds application for use with very thin layers of extruded film forming plastic material.

One object of this invention is to provide an improved lamination method and an improved product produced thereby.

Another object of the present invvention is to provide an improved method of preparing a laminated product comprised of at least three and preferably four or more laminated layers.

Still another object of the present invention is to provide an improved method wherein a laminated product comprised of three or more layers can be made in general by passing the three or more layers essentially simultaneously between a chill roller and a nip roller and wherein one of the three layers is subjected to a pre-heating step such that the heat imparted by the film forming plastic material and the pre-heating uniquely cooperate to bond together the layers that form the finished product.

Still another object of the present invention is to provide an improved method of preparing products such as a water vapor proof, flexible, heat sealable barrier material type of product.

Still another object of the present invention is to provide an improved lamination method applicable for use with very thin layers of a hot extruded film forming plastic material which constitutes one of the plies of the finished laminated product.

Other objects, features and advantages of the present invention will become apparent from the subsequent description and the appended claims taken in conjunction with the accompanying drawings.

BRIEF DESCRIPTION OF THE DRAWINGS

FIG. 1 illustrates in a generally side elevated plan view one embodiment of the laminating invention herein;

FIG. 2 illustrates another embodiment of the laminating operation herein; and

FIG. 3 illustrates still another embodiment of the laminating operation in accordance with the invention herein.

SUMMARY OF THE INVENTION

Briefly stated, the present invention comprises a method for preparing a heat sealed, laminated product of at least three ply, said product being comprised of: an extruded ply of an extruded film forming plastic material, a material ply consisting of a material layer made of a dissimilar material relative to the extended ply, a film ply of plastic made of a dissimilar material relative to said material layer and having a treated surface thereon which contacts said material layer, said treated surface being formed by flame treatment or electronic treatment, said method comprising the steps of: preheating at least one of said material or film plies in order to assist such plies in bonding to one another, heating said plastic material to form a hot extruded film forming plastic material of sufficiently elevated temperature such that it will generally help cause a heat sealed bond between the treated surface of said film ply and said material layer, bringing the hot extruded plastic material into firm contact with said material layer between a pair of moving surfaces, essentially simultaneously bringing the surface treated plastic material into firm contact, between said rotating surfaces, such that the treated surface thereof is in contact with said material layer, thus producing a heat sealed bond between the surface treated plastic material and said material layer due in substantial part to the heat generated by the hot extruded plastic material and also due in part to said preheating.

In another aspect, briefly stated, the present invention comprises a method for preparing a heat sealed, dry, laminated product of at least four ply wherein: the first ply is a substrate layer, the second ply is an extruded film forming plastic material made of a dissimilar plastic material relative to the first ply, the third ply is a material layer made of a dissimilar material relative to the second ply, the fourth ply is a plastic material layer having a treated surface, said fourth ply being made of a dissimilar material relative to the third ply, said treated surface being formed by flame treatment or electronic treatment, said method comprising the steps of: preheating at least one of said third and fourth plies in order to assist same in bonding to one another, heating said plastic material to form a hot extruded film forming plastic material of sufficiently elevated temperature such that it will generally help cause a heat sealed bond between the third and fourth ply materials, bringing the substrate layer into firm contact with the hot extruded film forming plastic material between a pair of moving surfaces, essentially simultaneously bringing the third ply layer into firm contact, between said rotating surfaces, with the extruded film forming plastic material, whereby said extruded material effectivvely bonds the first ply to the third ply, essentially simultaneously bringing the fourth ply plastic material into firm contact, between said rotating surfaces, such that said surface thereof is in contact with the third ply, thus producing a heat sealed bond between the third and fourth ply due in substantial part to the heat generated by the hot extruded plastic material and also due in part to said preheating.

From a product aspect, the invention concerns the product formed by the above methods.

DESCRIPTION OF PREFERRED EMBODIMENTS

In one aspect this invention concerns a means of supplying heat to the laminated nip exactly at the interface where it is required when very thin plies of extruded film forming plastic material such as extruded polyethylene are used. The discovered concept involves preheating a ply such as the foil material layer directly ahead of the laminating nip and, as presently preferred, the preheating is applied to the foil as close to the laminated nip as possible so that the foil will lose little of its heat to the air prior to the nip. Still further as presently preferred the foil should be brought into the nip at as deep an angle as possible to avoid long contact with the other ply layers ahead of the laminating nip. Using this technique it has been discovered that the foil will not lose its heat to the film which it contacts prior to the laminating nip by conduction. The foil layer (or the other ply layer which is subjected to the preheating operation) should be selected to be relatively stable dimensionally even up to temperatures above approximately 450°F. For example the foil layer does expand and contract in dimensions with changes in temperature to a considerable extent, byt the results of such expansion and contraction which are heat wrinkles for example can be compensated for or minimized by proper placement of spreader rolls (such as herringbones, Mt. Hope spreader rolls, and the like) subsequent to applications of heat to the foil or other preheated layer. As explained hereinbelow and in the drawings herewith the spreader rolls may be used simultaneously as heat is applied to the foil in the preheating operation. A further advantage in heating the foil layer (or other similar ply layer chosen for the preheating operation) is the fact that other than for shrinkage or expansion the physical characteristics such as stickiness, tensile strength, and hardness, are little affected by the range of temperature being considered for the preheating operation and necessary to assist in achieving a good bond between the treated film surface and the foil layer or other layer which is subjected to preheating.

The drawing FIG. 1 illustrates ground level or floor 10 upon which is mounted a supporting frame or structure 12. The structure 12 holds in rotationally mounted position a chill roller 14, and the nip roller 16, and a backup roller 18. Structure 12 also holds in rotationally mounted position a foil preheat roll 8, which may be steam, oil or electrically heated, and which contains for example a herringbone pattern machined in surface to spread the foil and deliver it in wrinkle free condition to the following foil preheat roll 9. Roll 9 may be steam, oil or electrically heated and it also contains for example a herringbone pattern machined in surface to act as a spreader roll to deliver wrinkle free and heated foil sheet to the laminating nip 20. Roll 11 is a spreader roll, for example of the rubber coated Mt. Hope type, to deliver a plastic film (e.g. polyethylene) in wrinkle free condition to laminating nip 20. The nip roller is mounted such that it is in pressurized contact with the chill roller at the point generally designated 20 with the point 20 being in general position between the nip roller and the chill roller where the layers of the laminate are pressed together in firm contact. The distance between roller 14 and 16 in the drawing figure has been exaggerated for purposes of illustration. It should be understood that these two rollers are essentially in firm contact with one another and that the various plies of layers are firmly pressed into contact therebetween. The nip roller 16 normally has a rubber surface thereon which will be described further hereinafter.

The substrate layer designated 22 is fed to the nip 20 from a supply roller (not shown). There is also fed to the nip 20 an extruded film forming plastic material designated 30, which extruded material is fed from the hopper or extruder generally designated 32 by passage through to the die designated 34. As is conventional with this type of extruder equipment the die 34 is in a heated condition and the extruded film forming material 30 passing through the die 34 is also in a hot melted condition as will be described in more detail hereinafter.

There is also fed to the nip 20 a third ply or layer material designated 40. The third ply 40 is also fed from a supply roller (not shown). A fourth ply material or layer designated 44 is also fed to the nip 20 from a supply roller (not shown).

The four ply finished product after passing through the nip section 20 moves around the outer surface of the chill roller 14 and then across suitable guide rollers such as that designated 50 (product strip off roll) and then the finished four ply laminate is wound onto a take-up roller designated 60.

As indicated in the drawing the chill roller is water cooled, however, it should be realized that numerous other fluids could be used for cooling of the chill roller. The chill roller, having a cooled surface facilitates the removal or peeling away of the finished laminate product from the chill roller (at which time it can be simultaneously trimmed or the like), then passed over the guide roller 50 onto the take-up roller 60 where the finished product is collected.

It should also be noted that the backup roller 18 is also water cooled, or cooled by any other suitable fluid such that the backup roller in cooled condition is able to facilitate removal of a certain amount of the heat generated in the nip roller.

The substrate layer described herein may suitably be any material such as paper, cloth, metal foils, Mylar, cellophane, kraftpaper, paperboard, and various metal sheets, plastic sheets or other film sheets or packaging materials. It should also be specifically understood that the substrate layer may be of the supported film type. For example, a film forming resin may be precast from a polymer solution, of a material such as cellulose acetate. Mylar, vinyl chloride acetate copolymer, polyvinyl butyral or the like, on a supporting slip sheet having release properties. The supporting film thus formed may then satisfactorily be used as the substrate layer, and after formation of the laminated product the slip sheet could if desired be stripped from the product, for example at the rewind station. By using this supported film principle it is considered that films may be cast and handled in thickness less than 1/10 of a mil.

The second ply or the extruded film forming plastic material preferably is comprised of an extrudable polyethylene plastic material. However, numerous other extruded film forming plastic materials may be used for the extrusion coating or film which forms the second ply and such other materials would be film forming extrudable polyolefins, extrudable vinyl resins, extrudable hot melt adhesives, and other extrudable plastic polymers and copolymers. These other such extrudable film forming plastic materials are known to those skilled in the art and need not be described in further detail here.

The third ply or material layer of the laminated product herein also may be comprised of numerous materials such as metal foils, metal sheets, paper, Mylar, certain forms of cloth sheets, certain forms of rubber sheeting materials, and numerous other plastic and/or metal sheets. The preferred material for use as the third ply or layer would be a material from the group of metal foils, paper, or Mylar. The best material to date for use as the third ply or layer is a metal foil.

The fourth ply or plastic material layer is preferably a polyolefin material which is adaptable to be surface treated, that is either subjected to electronic treatment or flame treatment to oxidize the surface thereof which comes in contact with the third ply, and in particular, such material would be surface treated polyethylene.

It should be understood that the surface treatments of the fourth ply material or layer may be carried out either just prior to lamination of the fourth ply or the surface treatment may be carried out in a separate operation after which the fourth ply or material layer is wound up into a roll and is ready for use in the process of this invention.

Furthermore, it should be understood that if both sides of the fourth ply or material layer are surface treated, then the fourth ply may be heat bonded not only to the third ply but it may also be heat sealed or bonded on its other side to one or more additional layers or plies (thereby forming a product of more than four plies) as the heat provided from the extrudate material and the preheating operation, is sufficient to effect a bond or heat seal when more than a four ply product is being made. Still further, while it should be understood that a polyolefin containing material is the preferred material for use as the fourth ply or layer in the process of this invention, there may also be used numerous other materials for the fourth ply such as those materials described in U.S. Pat. No. 3,081,214, and in particular these usable materials would be Mylar, ethylene glycol terephthalate polymer, cellulose ester compounds, regenerated cellulose materials, vinyl plastic compounds, and in general, polymers and copolymers, where feasible, of the aforementioned materials may also be used.

The thicknesses of the various plies or layers which make up the laminated product herein are generally limited in that each of the particular plies must have a thickness at or below a maximum beyond which the plies would not be sufficiently flexible to enable the proper operation of the process described herein. From a minimum thickness standpoint each of the plies may generally be very thin limited only by the strength of the particular material being used and the commercial availability of the various materials which are usable as the various plies or layers in carrying out the process.

In particular, it has been found that the thickness of the first ply or substrate layer may broadly vary within the range from about 1/10 mil up to about 100 mils. Preferably the thickness of the substrate layer should be within the range of about ½ to about 50 mils and best results have been obtained when this thickness is within the range of about ½ up to about 20 mils. The thicknesses given above for the first ply or layer are exemplary, and should not be taken as a limitation on the invention, for example, it would be possible to use materials such as corrugated shipping container lined on one side only, foamed or expanded plastic sheet, or the like, as stock for the basic substrate layer. In this event the substrate layer could satisfactorily have a thickness well over 50 mils.

In accordance with this improvement invention the thickness of the second ply, that is, the extruded film forming plastic material layer subsequent to passing through the die of the extruder and being deposited as a layer between the first and third plies passing through the nip section 20, should be such that the second ply has a thickness within the range of about 1/6 up to about ½ mils, or even greater where unusually thick conductive materials are used for the third ply, or where non-conductive materials are used for the third ply, such as paper, cloth, plastic or the like.

The thickness of the third ply or material layer should broadly be within the range of about 1/10 up to about 50 mils, and preferably this thickness sould be within the range of about ¼ up to about 5 mils. Best results have been obtained when the thickness of the third ply is held to within the range of about ¼ up to about 2 mils.

The thickness of the fourth ply or surface treated-oxidized plastic material layer should broadly be within the range of about 1/10 up to about 50 mils, and preferably this should be within the range of about ½ mil up to about 20 mils. Best results have been obtained when the thickness of the fourth ply is held to within the range of about 1 up to about 10 mils. It should also be understood, however, that the above thicknesses for the fourth ply are exemplary and should not be taken as a limitation on the invention. For example, the fourth ply could be a supported film, or a multi-laminate layer in itself, in which instance the fourth ply would have a thickness well above 50 mils. Still further, the fourth ply could satisfactorily be a foamed or expanded plastic sheet, or the like, in which instance again thicknesses considerably higher than 50 mils would be possible.

It should be understood all of the above thicknesses are generally dependent upon the particular material chosen for each ply in carrying out the lamination process herein. Generally certain of these thicknesses will be either higher or lower within the above specifications dependent upon the particular material used for each of the plies.

Furthermore it should be understood that the thicknesses specified hereinabove are not to be considered as limitations on the practice of this invention for the reason that the minimum thicknesses or the maximum thicknesses may be circumvented by the use of supported films for any of the various laminated layers; and, still further it is readily conceivable that further developments in the area of film or sheet material for use in this invention could lead to new unsupported films or sheets which would be usable in the invention and which would have thicknesses less than those specified herein.

The extruder output capacity necessary for the practice of the lamination process described herein is not particularly critical in that (dependent upon the width of the laminated product being made, the thickness of the plies, the linear speed of product being produced per minute, and like factors) desired operating conditions will determine the necessary selection of extruder equipment size and the like in accordance with established criteria.

The linear speed of laminated product produced in accordance with the process herein, may broadly vary within the range of about 25 up to about 2500 feet per minute. The lower range of linear speed would normally be used in carrying out the process when a heavy or dense extrudate material were being used as the second ply material described hereinabove. Preferably, the linear speed of product produced in carrying out the process herein should be within the range of about 100 up to about 1200 per minute, and best results to date have been obtained when this linear speed is within the range of about 180 up to about 350 feet per minute.

It should be understood that linear speed of the substrate layer or the linear speed of the product produced (which is approximately the same as the linear speed of the substrate material) is used as the governing criteria concerning the continuous movement of the various plies or layers through the apparatus in carrying out the process of this invention, that is, lineear speed is used as the governing criteria as opposed, for example, to measuring the tension in the various films or sheets which make up the plies described above. Those skilled in the art are aware of the necessary techniques, such as braking the various supply rollers to control the tensions on the various sheets or plies which are being fed to the nip section 20. The braking technique just mentioned may suitably be carried out in my invention by controlling the speed of rotation of the various supply rollers by friction brakes on the axles of these various rollers as is known to those skilled in the art.

The temperature of the extruded film forming plastic material or extrudate material as described hereinabove after leaving the die of the extruder equipment and just prior to being deposited upon the surface of the third ply 40 at the point designated 40a in the drawing, should generally be within the broad range of about 200°F up to about 700°F. Preferably this temperature of the extrudate material should be within the range of about 250°F up to about 630°F, and best results have been obtained when the temperature of the extrudate material just subsequent to leaving the extruder die is within the range of about 590°F up to about 620°F.

It should be understood that the overall and very important governing criteria which necessarily dictates what the temperature of the extrudate material should be is that the temperature of the extrudate assisted by the heat afforded from the preheating step should be sufficient to generate enough heat such that surface 44a of the fourth ply 44 will be heat sealed or bonded to the third ply 40. In the case of a polyethylene second ply, the temperature of extruded polyethylene may also be considered to be dictated by: degree of adhesion of the extruded layer and primary substrate layer, such as paper, and also by the degree of adhesion to the secondary substrate layer, such as foil. It is generally necessary to extrude polyethylene hot enough (preferably 590° – 620°F) for the surface of the curtain of extrudate to oxidize by exposure to air in the distance between the die lips and the laminating nip (draw distance). If extruded too cold, it won't adhere to either the primary or secondary substrate because the surface has not been polarized by oxidation.

The third or fourth ply is preferably preheated to somewhere in the approximate range of 140° to 450°F, depending on the specific material used (i.e. its condictivity, dimensional stability at elevated temperatures, etc.) and the thickness and temperature of the extruded ply. For example, foil may be safely preheated to approximately 250° – 350°F with satisfactory results.

The chill roller serves the purpose of reducing the temperature of the finished laminated product which leaves the nip section 20 such that the finished product is at least partially cooled before being wound up on the take-up roller.

Generally stated, the surface of the chill roller should generally be less than about 120°F, and from a broad temperature range standpoint this temperature should generally be between about 90°F and about 120°F. It should be understood that this temperature range is not a limitation on the practice of the invention.

Another important aspect of the process described herein is the application of an extruded film forming plastic material by extrusion coating on the substrate layer, which coating at the same time bonds the substrate layer or first ply to the third ply material described hereinabove. The extrusion coating described herein is carried out by extruding the molten film forming plastic material through a flat film die and the film is then drawn down from the die into the nip of the two rolls 14 and 16 located directly below the die 34. The substrate layer 22 is introduced over the rubber pressure roll or nip roller 16 and the substrate layer is then forced against the hot extruded film at the nip section 20. Simultaneously, the extruded or molten film forming plastic material is generally solidified and cooled by the chill roller 14. As the extrusion coating continues in indirect contact or relative closeness to the chill roller 14, it is further cooled and solidifies to form the second ply of the laminated product produced herein prior to being wound up on the take-up roller 60.

It should be understood that the extrusion coating aspect of the invention described herein forms one portion of a very complex process comprising many variables each of which effect the quality of the final or finished laminated product. These individual variables have been considered above in detail to a certain extent, however, it should be understood that the very complex process described herein may be carried out to produce a highly satisfactory finished product and also that so long as the subtle interreaction of the above variables is properly controlled that a highly desirable and commercially acceptable finished laminated product may be produced using the process herein in what may be termed a once through operation.

For further descriptions of extrusion coating techniques, reference is here made to the article "Polyethylene Extrusion Coatings" in the journal, Modern Packaging, April 1957 issue; and, the article "New Developments in Extrusion Coating" in the journal Plastics Technology, September 1966 issue. It should definitely be understood that while polyethylene constitutes the best material for use as the extrudate or extruded film forming plastic material described herein, that numerous other materials may also be used.

The treated or oxidized surface of the fourth ply material, that is, the surface treated polyolefin or plastic material layer which contacts the third ply may satisfactorily be prepared or surface treated by two physical methods. These two physical methods may be termed either flame treatment or electronic treatment, either of which treatments generally oxidizes the surface of the polyolefin or plastic material to render the surface more susceptible for proper bonding or heat sealing to the third ply. One electronic treatment for preparation of the polyolefin or plastic material of this type is generally described in U.S. Pat. No. 3,018,189, and flame treatment for surface treating such a polyolefin or plastic material is described in U.S. Pat. No. 3,075,868.

The heat generated by the extrudate material and the preheating operation is important in that it provides for the proper bonding or heat sealing of the fourth ply to the third ply such that the entire process described herein can be carried out in a once through manner by passing the four plies through the nip section 20 formed between the two rollers 14 and 16. I have found that unless this generated heat or temperature is properly controlled and maintained that then the practice of my invention cannot be satisfactorily carried out.

In the preparation of the four ply product generally described above, as previously mentioned, I have generally used a rubber or resilient material surfaced roller as the nip roller 16. Generally stated, this rubber surface may have a hardness within the range of about 60 to about 90 durometer hardness. It should be understood that the lower limit of 60 durometer hardness would not be applicable if for example a soft expanded material were being used, as the material forming the extruded film forming plastic, or as the material forming the substrate layer or the fourth layer. In this event the nip roller or pressure roll would have to be of a considerably softer nature ranging in hardness from sponge rubber up to 60 durometer.

A 70 durometer roll gives good results, however, for the four ply laminations I prefer 90 durometer because soft rubber rolls in some instances distort too much in the nip and stretch and wrinkle cellophane and particularly foil. There have been extrusion coating laminators made for processing less dense substrates, and particularly thick ones such as board from 10 to 30 point where instead of a rubber laminating roll there is used a chrome plated steel roll having a very high hardness. With such substrate materials, they are in themselves resilient and furnish their own cushion in the laminating nip.

Preferably when preparing the four ply products such as those described above a rubber or other resilient surfaced roller should be used with a hardness within the range of about 60 to about 90 durometer hardness, and best results have been obtained using a surface in the range of about 65 to about 70 durometer hardness. It has been found that a rubber or resilient material surfaced roller, as described above, when properly selected dependent upon the various materials used as the different ply layers in the product, provides what may be termed a contact duration or dwell between the two rollers in the nip section 20 amounting to about one inch to about 1-½ inches preferably, and broadly between about ½ inch and about 2 inches.

The process described hereinabove has been generally directed to the formation of a four or more plies laminated product. A description will now be given of another embodiment of the process invention herein wherein my invention may be used to form a three ply product.

As may be seen in the drawing figures if the first ply 22 is omitted from passage through the nip section 20, that is, if the first ply 22 is simply omitted from the process, then a three ply laminated product comprised of ply 44, ply 40 and the ply formed by the extruded film 30 is formed. Such a three ply product still embodies a main principle of my invention, that is, the hot extruded film 30 which generates a substantial amount of heat (as is delineated hereinabove) provides a sufficient heating effect on the ply 40 such that the heat is transferred through ply 40 and is of sufficient magnitude to cause a heat bonding or sealing between the treated surface 44a of ply 44 such that the treated surface 44a is bonded to the ply 40. The process to produce such a three ply product is generally the same as the process described hereinabove except that the first ply 22 is omitted from the operation. The result of preparing such a three ply product in accordance with my invention has many utilities as will be described hereinafter, however, in particular this process produces in a unique and economical manner a product which through proper choice of materials to form the ply 30 and the ply 44 results in a finished sheeting material which is heat sealable on both of its exterior sides. Furthermore this type of three ply product differs very essentially from an extrusion sandwich lamination three ply product due to the concept discovered and disclosed herein which is based on the phenomena that the heat generated by the hot extrudate material may be used to heat seal or bond a second and third ply while at the same time the hot extrudate is deposited as a film or layer forming the first ply of the product.

An important aspect of forming a three ply product as described immediately above is that the surface of the nip roller should be a surfaace having excellent release characteristics since in the absence of the ply or layer 22 the hot and relatively sticky extruded film 30 makes direct contact with the nip roller 16. Therefore, in order to provide the nip roller 16 with a surface having good release characteristics, it has been found that the surface of the nip roller may be covered with a Teflon tape material, or it may be covered with a silicon material, or numerous other materials so long as the surface of the nip roller in contact with the hot extruded film 30 possesses good release characteristics so that the extruded film 30 will not stick to the nip roller 16. It should furthermore be understood that when a material having good release characteristics is used for this purpose in covering the nip roller 16, such as for example a Teflon tape covering, that such tape-like material normally will have sufficient flexibility such that the resilience or hardness characteristics described above for the surface of the nip roller 16 are fulfilled.

Another variation of forming a product containing at least three or more plies as described hereinabove is that the plastic material layer may be passed directly over the nip roller, and then a material layer such as paper, foil, cellophane, etc., may be passed also over the nip roller such that it is brought into contact with a treated surface side of the plastic material layer aand then these two layers are brought into contact with the extruded film forming plastic material, such that the three ply product formed is one wherein the extrudate is in contact with the chill roller rather than the nip roller as described above.

The process, and product produced thereby, in accordance with this disclosure have numerous and different utilities. For example, the process can be used for producing packaging materials for food, or for producing materials from which accessory packets may be constructed with said accessory packets being for the purpose of containing cigarettes, matches, chewing gum, or numerous other items. Still further, the process disclosed herein may be used for preparing barrier materials for sealing and/or moisutre-proofing various items. Still further, numerous other uses of my invention disclosed herein will be apparent to those skilled in the art.

FIG. 2 illustrates another embodiment of the invention wherein like numerals indicate like elements relative to FIG. 1. In FIG. 2 the first ply 22 is the primary substrate (of a material such as paper) of a 4-ply product. The second ply 30 is the extrudate material being extruded and drawn from the die lip 34. The third ply 40 is a material such as foil. The fourth ply 44 is a polyethylene film which has been corona discharge treated on its one side adjacent to the foil. Element 108 is an unheated herringbone idler foil spreader roll. Element 109 is a steam, oil, or electrically heated foil preheating roller, which as presently preferred is formed of a steel shell with chrome plated surfaces with matte finish to allow the foil to spread and not stick to the roller and form wrinkles. Element 110 is an unheated herringbone idler foil spreader roll. Element 111 is a Mt. Hope film spreader roll. Element 112 is a smooth light weight aluminum idler roller. Element 113 is the product strip-off roller. Element 114 is the finished 4-ply product being directed to a product wind up roller, not shown.

FIG. 3 illustrates another embodiment of the invention wherein like numerals indicate like elements relative to FIG. 1. In FIG. 3 the construction is essentially the same as in FIG. 1 with the following exceptions. Element 208 is an unheated herringbone foil spreader roll. Element 209 is a high intensity infra red heater of the electrical or gas powered type. Element 210 is an unheated herringbone foil spreader roller. Element 211 is also an unheated herringbone spreader roller. Element 212 is a Mt. Hope film spreader roller.

It should also be recognized that in certain instances 1 - 2 or even 5 mils of extrudate thickness may be used herein. For example this would be applicable to constructions which would have to use preheating wherein the foil layer was 1 mil, 2 mil, or 5 mil. As exemplary of such an instance it is meant a construction such as this: (1) 2 mils PE film, (2) 1 mil foil, (3) polyvinyl chlorideacetate copolymer extrudate necessarily extruded at temperatures below 350°F.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method for preparing a heat sealed, dry, laminated product of at least four ply wherein the first ply is a substrate layer, the second ply is a thin extruded film-forming plastic material made of a dissimilar plastic material relative to the first ply and having a thickness as small as about 1/6 mil, the third ply is a material layer made of dissimilar material relative to the second ply, and the fourth ply is a plastic material layer having a treated surface, said fourth ply being made of a dissimilar material relative to the third ply, said treated surface being formed by flame treatment or electronic treatment, said method comprising the steps of: preheating at least one of said third and fourth plies to a temperature between about 140°F and about 450°F in order to assist same in bonding to one another, heating said film-forming plastic material to form a hot extruded film-forming plastic material of sufficiently elevated temperature such that it will generally help cause a heat sealed bond between the third and fourth ply materials, bringing the substrate layer into firm contact with the hot extruded film-forming plastic material between a pair of moving surfaces, preventing the plies from contacting one another substantially until they are brought together between the moving surfaces, essentially simultaneously bringing the third ply layer into firm contact between said moving surfaces with the extruded film-forming plastic material whereby said extruded material effectively bonds the first ply to the third ply, and essentially simultaneously bringing the fourth ply plastic material into firm contact between said moving surfaces such that said surface thereof is in contact with the third ply, thus producing a heat sealed bond between the third and fourth ply due in substantial part to the heat generated by the hot extruded plastic material and also due in part to said preheating.

2. The method of claim 1, wherein said third ply is the preheated ply.

3. The method of claim 1, wherein said second ply has a thickness between about 1/6 and about ½ mils.

4. The process of claim 1, wherein said extruded film-forming plastic material is formed substantially of polyethylene, and said fourth ply is formed substantially of polyethylene.

5. The invention of claim 1, wherein said preheating is carried out by passing at least one of said plies over at least two heated herringbone foil spreader rolls.

6. The invention of claim 1, wherein said preheating is carried out by passing at least one of said plies over a matte finished heated roll and then over an unheated herringbone spreader roll.

7. The invention of claim 1, wherein said preheating is carried out by passing at least one of said plies past an infra-red heater and then over an unheated herringbone spreader roll.

8. A process for preparing a heat sealed, laminated product of at least four ply, said product being comprised of a first ply of substrate layer, a second ply of a thin extruded film-forming plastic material and having a thickness as small as about 1/6 mil, a third ply of a material layer made of a dissimilar material relative to the extruded film-forming plastic material, and a fourth ply of a plastic material made of a dissimilar material relative to said material layer and having an oxidized surface thereon which contacts said material layer, said method comprising the steps of: preheating at least one of said third and fourth plies to a temperature between about 140°F and about 450°F in order to assist same in bonding to one another, heating said film-forming plastic material to form a hot extruded film-forming plastic material of a sufficiently elevated temperature such that it will generally help cause a heat sealed bond between the oxidized surface of said plastic material and said material layer, bringing the hot extruded plastic material into firm contact with said material layer on a moving nip surface means, preventing the plies from contacting one another substantially until they are brought together between the moving nip surface means, and essentially simultaneously bringing the surface oxidized plastic material into said firm contact such that the oxidized surface thereof is in contact with said material layer, thus producing a heat sealed bond between the surface oxidized plastic material and said material layer.

9. The method of claim 8, wherein said material layer is the preheated ply.

10. The method of claim 8, wherein said second ply has a thickness between about 1/6 and about ½ mils.

11. The method of claim 8, wherein said elevated temperature is within the range of about 250°F to about 620°F.

12. The method of claim 8, wherein said extruded film-forming plastic material is a polyolefin material.

13. The method of claim 12, wherein said third ply comprises metal foil.

* * * * *

UNITED STATES PATENT AND TRADEMARK OFFICE
CERTIFICATE OF CORRECTION

PATENT NO. : 3,976,528
DATED : August 24, 1976
INVENTOR(S) : Albert L. James

It is certified that error appears in the above–identified patent and that said Letters Patent are hereby corrected as shown below:

Column 1, line 37, "invention" should be --inventive--

Column 2, line 31, "extended" should be --extruded--

Column 3, lines 9 and 10, "effectivvely" should be --effectively--

Column 3, line 43, "byt" should be --but--

Column 4, line 13, after "20 being in" insert --the--

Column 4, line 19, "of" should be --or--

Column 6, line 34, "sould" should be --should--

Column 7, line 34, "lineear" should be --linear--

Column 11, line 16, "moisutre" should be --moisture--

Signed and Sealed this

Second Day of November 1976

[SEAL]

Attest:

RUTH C. MASON
*Attesting Officer*

C. MARSHALL DANN
*Commissioner of Patents and Trademarks*